(12) United States Patent
Garg et al.

(10) Patent No.: US 10,696,826 B2
(45) Date of Patent: Jun. 30, 2020

(54) BIMODAL HIGH DENSITY POLYETHYLENE

(71) Applicant: SABIC GLOBAL TECHNOLOGIES B.V., Bergen op Zoom (NL)

(72) Inventors: Priya Garg, Vaals (NL); Nicolaas Hendrika Friederichs, Brunssum (NL); Tom Schoffelen, Hulsberg (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 32 days.

(21) Appl. No.: 15/743,854

(22) PCT Filed: Jun. 30, 2016

(86) PCT No.: PCT/EP2016/065346
§ 371 (c)(1),
(2) Date: Jan. 11, 2018

(87) PCT Pub. No.: WO2017/009058
PCT Pub. Date: Jan. 19, 2017

(65) Prior Publication Data
US 2018/0208749 A1   Jul. 26, 2018

(30) Foreign Application Priority Data
Jul. 16, 2015 (EP) .................................... 15177052

(51) Int. Cl.
| C08F 210/16 | (2006.01) |
| C08F 4/655 | (2006.01) |
| C08L 23/06 | (2006.01) |
| F16L 9/12 | (2006.01) |
| C08L 23/08 | (2006.01) |
| C08L 23/20 | (2006.01) |

(52) U.S. Cl.
CPC ............ *C08L 23/06* (2013.01); *C08F 210/16* (2013.01); *C08L 23/0815* (2013.01); *C08L 23/20* (2013.01); *F16L 9/12* (2013.01); *C08L 2203/18* (2013.01); *C08L 2205/025* (2013.01); *C08L 2207/062* (2013.01); *C08L 2308/00* (2013.01); *C08L 2314/02* (2013.01)

(58) Field of Classification Search
CPC ...... C08L 23/06; C08L 23/0815; C08L 23/20; C08L 2203/18; C08L 2205/025; C08L 2207/062; C08L 2308/00; C08F 210/16; F16L 9/12
See application file for complete search history.

(56) References Cited

U.S. PATENT DOCUMENTS

| 4,178,300 A | 12/1979 | Van Den Berg |
| 6,225,421 B1 | 5/2001 | Promel et al. |
| 6,770,341 B1 * | 8/2004 | Bohm ................. C09D 123/04 138/137 |
| 2007/0207281 A1 * | 9/2007 | Backman ................ C08F 10/02 428/34.7 |

FOREIGN PATENT DOCUMENTS

| AU | 199879962 A1 | 3/1999 |
| EP | 0989141 A1 | 3/2000 |
| EP | 0876318 B1 | 8/2000 |
| EP | 1146079 A1 | 10/2001 |
| EP | 1201711 A1 | 5/2002 |
| EP | 1201713 A1 | 5/2002 |
| EP | 1460105 A1 | 9/2004 |
| EP | 1655337 A1 | 5/2006 |
| EP | 1719788 A1 | 11/2006 |
| WO | 9414855 A1 | 7/1994 |
| WO | 9722633 A1 | 6/1997 |
| WO | 0001765 A1 | 1/2000 |
| WO | 0022040 A1 | 4/2000 |
| WO | 03016396 A1 | 2/2003 |
| WO | 2013087167 A2 | 6/2013 |
| WO | WO-2013087167 A2 * | 6/2013 |

OTHER PUBLICATIONS

Alt et al., "Bimodal Polyethylene—Interplay of Catalyst and Process," Macromol. Symp. 2001, 163, 135-143.
Kurelec et al., Strain hardening modulus as a measure of environmental stress crack resistance of high density polyethylene, Polymer 46 (2005) p. 6369-6379.
PE 100 Pipe Systems, second edition, Heiner Bromstrup (editor), 2004, pp. 16-20 ISBN 3-8027-2728-2.
International Search Report for International Application No. PCT/EP2016/065346; International Filing Date: Jun. 30, 2016; dated October 7, 2016; 7 Pages.
Written Opinion of the International Searching Authority for International Application No. PCT/EP2016/065346; International Filing Date: Jun. 30, 2016; dated Oct. 7, 2016; 5 Pages.
An Experimental Report; Cited in Opposition of EP14601405 and Received at the EPO on Feb. 22, 2013; 2 Pages.
Annex 1 Comparison with claim 1 of 2nd Auxilliary Request; Received at the EPO on Apr. 29, 2015; 1 Page.
ASTM D3350-99, Standard Specification for Polyethylene Plastics Pipe and Fittings Materials, ASTM International, West Conshohocken, PA, 2014; pp. 297-302.
Declaration of M. Backman and Experimental Report; Opposition of EP1460105; Filed with the EPO on Jul. 6, 2010; 7 Pages.

(Continued)

*Primary Examiner* — Irina S Zemel
*Assistant Examiner* — Jeffrey S Lenihan
(74) *Attorney, Agent, or Firm* — Cantor Colburn LLP

(57) ABSTRACT

The invention is directed to bimodal polyethylene having a flow ratio FRR ranging between ≥30 and ≤40, a density ranging between ≥949.0 and ≤952.0 kg/m3, an $MFR_{190/5}$ ranging between ≥0.1 and ≤0.2 g/10 min and comprising from 50 to 54% by weight of an ethylene homopolymer A and from 46-50% by weight of an ethylene-butene copolymer B, where all percentages are based on the total weight of the composition and wherein ethylene homopolymer A has a viscosity number ≥70 and ≤100 cm3/g and a density between ≥968 and ≤972 kg/m3. The polyethylene is suitable to be applied in the production of pipes.

9 Claims, No Drawings

(56) References Cited

OTHER PUBLICATIONS

Distribution Piping Systems, Technical Handbook, Georg Fischer Wavin, Schaffhausen, Switzerland, 2000, pp. 2.1-2.5.

EN ISO 527-2: Plastics—Determination of tensile properties—Part 2: Test conditions for moulding and extrusion plastics; May 1996; 10 Pages.

Finathene polyethylene, XSene bimodal ethylene-hexene copolymers: The latest technological advance, Fina Chemicals (1998); 7 Pages.

Finathene XS 10B, Das schwarze PE 100 va FINA, Fina Chemicals (1998); 3 Pages.

ISO 4427 Polyethylene (PE) pipes for water supply—Specifications; First edition Dec. 15, 1996; 19 Pages.

ISO 9080 Plastics piping and ducting systems—Determination of the long-term hydrostatic strength of thermplastics materials in pipe form by extrapolation; First edition Mar. 15, 2003; 32 Pages.

L.E. Janson, "Plastics Pipes for Water Supply and Sewage Disposal", Borealis, Sven Axelsson AB/Faldts Grafiska AB, Stockholm, 1999, 3rd Ed., pp. 24-27 and 96-97.

Murphy, "The Additives for Plastics Handbook," Elsevier Advanced Technology, 1997, 3 Pages.

Notice of Opposition (Grounds of Opposition); European Patent No. 1460105; Received at the EPO dated Feb. 22, 2013; 11 Pages.

Notice of Opposition (Grounds of Opposition); European Patent No. 1460105; Received at the EPO dated Feb. 22, 2013; 9 Pages.

Notice of Opposition; European Appln. No. 00108175.1; Date of Submission: Mar. 12, 2009; 18 Pages.

T 0943/00 Decision on Appeal dated Jul. 31, 2003; Cited in Opposition of EP1460105; 32 Pages.

The Polymer Processing Society: Prediction of MFR of bimodal polyethylenes, Hagstrom, published 1997; 3 Pages.

\* cited by examiner

BIMODAL HIGH DENSITY POLYETHYLENE

CROSS REFERENCE TO RELATED APPLICATIONS

This application is a 371 of International Application No. PCT/EP2016/065346, filed Jun. 30, 2016, which claims priority to European Application No. 15177052.6, filed Jul. 16, 2015 which are incorporated herein by reference in their entirety.

The present invention relates to bimodal high density polyethylene and a pressure pipe comprising the bimodal polyethylene.

The production processes for bimodal high density polyethylene (HDPE) are summarised at pages 16-20 of "PE 100 Pipe systems" (edited by Brömstrup; second edition, ISBN 3-8027-2728-2).

The production of bimodal high density polyethylene (HDPE) via a low pressure slurry process is described by Alt et al. in "Bimodal polyethylene-Interplay of catalyst and process" (Macromol.Symp. 2001, 163, 135-143). In a two stage cascade process the reactors may be fed continuously with a mixture of monomers, hydrogen, catalyst/co-catalyst and diluent recycled from the process. In the reactors, polymerisation of ethylene occurs as an exothermic reaction at pressures in the range between for example 0.2 MPa (2 bar) and 1 MPa (10 bar) and at temperatures in the range between for example 75° C. and 85° C. The heat from the polymerisation reaction is removed by means of external cooling. The characteristics of the polyethylene are determined amongst others by the catalyst system and by the concentrations of catalyst, co monomer and hydrogen.

The concept of the two stage cascade process is elucidated at pages 137-138 by Alt et al. "Bimodal polyethylene-Interplay of catalyst and process" (Macromol.Symp. 2001, 163). The reactors are set up in cascade with different conditions in each reactor including for example a high hydrogen content in the first reactor and a low hydrogen content in the second reactor. This allows for the production of HDPE with a bimodal molecular mass distribution and desired co monomer content in the polyethylene chains. For reasons of monomer efficiency, it is common practise that the polymer suspension or "slurry" obtained after the second reactor flows into a so-called post reactor. In this reactor the final polymerisation takes place, resulting in a conversion rate of more than 99% of the monomers used. The suspension then flows to a suspension receiver and the suspension leaving the receiver is separated, for example via a decanter centrifuge. The resulting wet polymer is fed to a fluidised bed dryer and the liquid part goes back to the reactors. After drying the extrusion step takes place. The solvent coming from the drying of the polymer is recycled after purification by amongst other distillation.

For the reliable supply of modern infrastructure with natural gas or water, buried pipes play an important role to maintain high living standards. In the field of pressurized pipes, polymer pipes made of bimodal polyethylene have been used for many years. Initially, PE pipes were applied in the low-pressure regime up to 4 (gas) and 6 bar (water), respectively, today they are typically operated at pressure levels of up to 10 (gas) and 16 bar (water) and even higher. Pressurized PE pipes are designed to fulfill operating times of at least 50 years. The material classification of PE pipe grades is based on the long-term failure behavior using internal pipe pressure tests at different temperatures and extrapolation methods as described in EN ISO 9080 or ASTM D2837. Based on these tests, the minimum required strength (MRS) to ensure pipe lifetimes of at least 50 years is determined and leads to a classification of the materials as for example PE 80 (MRS=8 MPa) or PE 100 (MRS=10 MPa).

It is the object of the present invention to provide a HDPE grade having an improved hydrostatic strength while other properties such as for example slow crack growth resistance and impact resistance have values which are preferably higher than the values for PE 100 grade.

The bimodal polyethylene according to the invention has a flow ratio FRR ranging between $\geq 30$ and $\leq 40$, a density ranging between $\geq 949.0$ and $\leq 952.0$ kg/m$^3$, an MFR$_{190/5}$ ranging between $\geq 0.1$ and $\leq 0.2$ g/10 min and comprising from 50 to 54% by weight of an ethylene homopolymer A and from 46 to 50% by weight of an ethylene-butene copolymer B, where all percentages are based on the total weight of the composition and wherein ethylene homopolymer A has a viscosity number $\geq 70$ and $\leq 100$ cm$^3$/g and a density between $\geq 968$ and $\leq 972$ kg/m$^3$ and wherein the bimodal polyethylene has impact resistance (according to notched Charpy measurements at 23° C.; ISO 179)$\geq 30$ kJ/m$^2$ and $\leq 40$ kJ/m$^2$ impact resistance (notched Charpy measurements at −30° C.; ISO 179) $\geq 15$ kJ/m$^2$ and $\leq 20$ kJ/m$^2$ strain hardening (measured according to the strain hardening method, based on the publication by Kurelec, L. et al in *Polymer* 2005, 46, p 6369-6379) $\geq 40$ MPa and $\leq 50$ MPa and shear thinning index $\geq 65$ and $\leq 80$.

The density of polyethylene and copolymer A is determined according to ISO 1183.

The viscosity number of polyethylene and homopolymer A is determined according to ISO 1628-3.

The Flow Rate Ratio (FRR) is calculated as MFR$_{190/21.6}$/MFR$_{190/5}$. FRR is indicative for the rheological broadness of the material.

The melt-indices MFR$_{190/5}$ and MFR$_{190/21.6}$ are measured according to method ASTM D-1238 under a load of 5 and 21.6 kg respectively at 190° C.

The MWD of the polyethylene ranges between 25 and 55, preferably between 30 and 40.

According to a preferred embodiment of the invention the density of ethylene homopolymer A ranges between $\geq 969$ and $\leq 971$ kg/m$^3$.

According to a preferred embodiment of the invention the viscosity number of ethylene homopolymer A ranges between $\geq 75$ and $\leq 90$ cm$^3$/g.

The density of the bimodal polyethylene ranging between $\geq 949.0$ and $\leq 952.0$ kg/m$^3$ is based on base polymer without colourants such as carbon black.

According to a preferred embodiment of the invention, the density of the bimodal polyethylene ranges between $\geq 949$ and $\leq 951$ kg/m$^3$.

Preferably, the bimodal polyethylene comprises from 50 to 52% by weight of an ethylene homopolymer A and from 48 to 50% by weight of an ethylene-butene copolymer B.

The pipe tests based on this polyethylene shows excellent results as shown in the examples.

The pipes show an excellent pressure resistance at 20° C., 12 Mpa (measured according to ISO 1167 with pipe dimensions 32×3 mm) >8000 hours, preferably >9000 hours, more preferably >10000 hours.

It is the advantage of the present invention that the ethylene butene copolymer has a higher hydrostatic strength (pressure resistance) than a PE 100 grade and furthermore improved mechanical properties such as for example impact resistance and strain hardening.

Furthermore, the polymer according to the invention has a good low sagging performance and good processability.

It is surprising that the bimodal polyethylene having a Flow Rate Ratio ranging between ≥30 and ≤40, a density ranging between ≥949.0 and ≤952.0 kg/m³ and being based on an ethylene homopolymer A having a density between ≥968 and ≤972 kg/m³ results in a polyethylene having a higher hydrostatic strength than a PE100 grade.

The amount of butene incorporated in the ethylene-butene copolymer B ranges from ≥0.1 to ≤5% by weight.

The bimodal polyethylene according to the invention is a polyethylene obtained with a polymerisation in the presence of a Ziegler-Natta catalyst system.

According to a preferred embodiment of the invention the high density polyethylene is produced with a two-step slurry polymerisation process using cascaded reactors in the presence of a Ziegler Natta catalyst system.

According to a further preferred embodiment of the invention the high density ethylene copolymer is produced with a two-step slurry polymerisation process using cascaded reactors in the presence of a catalyst system comprising (I) the solid reaction product obtained by reaction of:
a) a hydrocarbon solution containing
1) an organic oxygen containing magnesium compound or a halogen containing magnesium compound and
2) an organic oxygen containing titanium compound and
b) an aluminium halogenide having the formula $AlR_nX_{3-n}$ in which R is a hydrocarbon moiety containing 1-10 carbon atoms, X is halogen and 0<n<3 and
(II) an aluminium compound having the formula $AlR_3$ in which R is a hydrocarbon moiety containing 1-10 carbon atom.

During the reaction of the hydrocarbon solution comprising the organic oxygen containing magnesium compound and the organic oxygen containing titanium compound with component (I b) a solid catalyst precursor precipitates and after the precipitation reaction the resulting mixture is heated to finish the reaction.

The aluminium compound (II) is dosed prior to or during the polymerization and may be referred to as a cocatalyst.

Suitable organic oxygen containing magnesium compounds include for example magnesium alkoxides such as magnesium methylate, magnesium ethylate and magnesium isopropylate and alkylalkoxides such as magnesium ethylethylate and so called carbonized magnesiumalkoxide such as magnesium ethyl carbonate.

Preferably, the organic oxygen containing magnesium compound is a magnesium alkoxide. Preferably the magnesium alkoxide is magnesium ethoxide $Mg(OC_2H_5)_2$.

Suitable halogen containing magnesium compounds include for example magnesium dihalides and magnesium dihalide complexes wherein the halide is preferably chlorine.

Preferably the hydrocarbon solution comprises an organic oxygen containing magnesium compound as (I) (a) (1).

Suitable organic oxygen containing titanium compound may be represented by the general formula $[TiO_x(OR)_{4-2x}]_n$ in which R represents an organic moiety, x ranges between 0 and 1 and n ranges between 1 and 6.

Suitable examples of organic oxygen containing titanium compounds include alkoxides, phenoxides, oxyalkoxides, condensed alkoxides, carboxylates and enolates. Preferably the organic oxygen containing titanium compounds is a titanium alkoxide. Suitable alkoxides include for example $Ti(OC_2H_5)_4$, $Ti(OC_3H_7)_4$, $TiOC_4H_9)_4$ and $Ti(OC_8H_{17})_4$. Preferably the organic oxygen containing titanium compound is $Ti(OC_4H_9)_4$.

Preferably the aluminium halogenide is a compound having the formula $AlR_n$ in which R is a hydrocarbon moiety containing 1-10 carbon atoms, X is halogen and 0.5<n<2. Suitable examples of the aluminium halogenide in (I) b having the formula $AlR_nX_{3-n}$ include ethyl aluminium dibromide, ethyl aluminium dichloride, propyl aluminium dichloride, n-butyl aluminium dichloride, iso butyl aluminium dichloride, diethyl aluminium chloride, diisobutyl aluminium chloride. Preferably X is Cl. Preferably the organo aluminium halogenide in (I) b) is an organo aluminium chloride, more preferably the organo aluminium halogenide in (I) b) is chosen from ethyl aluminium dichloride, diethyl aluminium dichloride, isobutyl aluminium dichloride, diisobutyl aluminium chloride or mixtures thereof.

Generally the molar ratio of Al from I b): Ti from I a) 2 ranges between 3:1 and 16:1. According to a preferred embodiment of the invention the molar ratio of Al from I b): Ti from I a) 2 ranges between 6:1 and 10:1.

Suitable examples of the cocatalyst of the formula $AlR_3$ include tri ethyl aluminium, tri isobutyl aluminium, tri-n-hexyl aluminium and tri octyl aluminium. Preferably the aluminium compound in (II) of the formula $AlR_3$ is tri ethyl aluminium or tri isobutyl aluminium.

The hydrocarbon solution of organic oxygen containing magnesium compound and organic oxygen containing titanium compound can be prepared according to procedures as disclosed for example in U.S. Pat. No. 4,178,300 and EP0876318. The solutions are in general clear liquids. In case there are any solid particles, these can be removed via filtration prior to the use of the solution in the catalyst synthesis.

Generally the molar ratio of magnesium:titanium is lower than 3:1 and preferably the molar ratio magnesium:titanium ranges between 0.2:1 and 3:1.

Generally the molar ratio of aluminium from (II):titanium from (a) ranges between 1:1 and 300:1 and preferably the molar ratio of aluminium from (II):titanium from (a) ranges between 3:1 and 100:1.

The catalyst may be obtained by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and the organo aluminium halogenide having the formula $AlR_nX_{3-n}$ Generally, the aluminium halogenide having the formula $AlR_nX_{3-n}$ is used as a solution in a hydrocarbon. Any hydrocarbon that does not react with the organo aluminium halogenide is suitable to be applied as the hydrocarbon.

The sequence of the addition can be either adding the hydrocarbon solution containing the organic oxygen containing magnesium compound and organic oxygen containing titanium compound to the compound having the formula $AlR_nX_{3-n}$ or the reversed.

The temperature for this reaction can be any temperature below the boiling point of the used hydrocarbon. Generally the duration of the addition is preferably shorter than 1 hour.

In the reaction of the hydrocarbon solution of the organic oxygen containing magnesium compound and the organic oxygen containing titanium compound with the organo aluminium halogenide of formula $AlR_nX_{3-n}$, the solid catalyst precursor precipitates. After the precipitation reaction the resulting mixture is heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

The polymerization can be carried out in the presence of an anti-static agent or anti fouling agent in an amount ranging between for example 1 and 500 ppm related to the total amount of reactor contents.

The polyethylene is suitable to be applied in the production of pipes, pipe fittings, films, blow molding applications and injection molding.

Preferably the polymer according to the invention is applied in the production of pipes for transport of drinking water.

EP1460105 discloses a bimodal polyethylene having a density greater than or equal to 953.0 kg/m$^3$ and SHI of 70 or more to reach a PE125 type of pipe material.

EP1146079 discloses a polyethylene resin having a FRR greater than 38 and overall density greater than 953 kg/m$^3$.

U.S. Pat. No. 6,225,421 discloses bimodal polyethylene having a density 948.7 kg/m$^3$, an MFR$_{190/5}$ 0.3 g/10 min and comprising from 50.8% by weight of an ethylene homopolymer A and from 49.2% by weight of an ethylene-butene copolymer B wherein ethylene homopolymer A has a density 972 kg/m$^3$. The differences between the present invention and U.S. Pat. No. 6,225,421 will result in different pipe properties.

WO2013087167 is directed to a process in the presence of donors and the bimodal polyethylene has a flow ratio FRR 34, a density 948.0, a MFR$_{190/5}$ 0.21 g/10 min and comprising from 51% by weight of an ethylene homopolymer A and 49% by weight of an ethylene-butene copolymer B and wherein the bimodal polyethylene granules have impact resistance (notched Charpy measurements at −30° C.; ISO 179) 10 kJ/m$^2$ and strain hardening (measured according to the strain hardening method, based on the publication by Kurelec, L. et al in *Polymer* 2005, 46, p 6369-6379) 55 MPa. The differences between the present invention and WO2013087167 will result in different pipe properties.

EP1719788 discloses bimodal polyethylene having a flow ratio FRR ranging between 27 and 30, a density ranging between 950 and 955 kg/m$^3$, an MFR$_{190/5}$ ranging between 0.25 and 0.35 g/10 min and comprising 50% by weight of an ethylene homopolymer A and 50% by weight of an ethylene-butene copolymer B, wherein ethylene homopolymer A has a density 970 kg/m$^3$. The differences between the present invention and EP1719788 will result in different pipe properties.

The invention will be elucidated by means of the following non-restrictive examples.

EXAMPLES

The solids content in the catalyst suspension was determined in triplo by drying 5 ml of a catalyst suspension under a stream of nitrogen, followed by evacuating for 1 hour and subsequently weighing the obtained amount of dry catalyst.

The density of the polymers is measured according to ISO1183.

The viscosity number is determined according to ISO 1628-3.

The melt-indices MFR$_{190/5}$ and MFR$_{190/21.6}$ are measured according to method ASTM D-1238 under a load of 5 and 21.6 kg at 190° C.

The Flow Rate Ratio (FRR) being calculated as MFR$_{190/21.6}$/MFR$_{190/5}$ is indicative for the rheological broadness of the material.

The split of the bimodal polymer is defined as the weight fraction of the lower molecular weight material in the overall polymer. For the semi-batch process as described in the following polymerization examples, this translates into the cumulative ethylene consumption from the first polymerization step compared to the cumulative ethylene consumption in the combined first and second step.

The elemental compositions of the catalysts were analysed using Neutron Activation Analysis.

The alkoxide content in the final catalyst was determined by GC analysis of a water-quenched catalyst sample.

The tensile tests were performed according to ISO 527-2.

Notched Charpy measurements were performed according to ISO 179

The resistance to so called slow crack growth was measured using the strain hardening method, based on the publication by Kurelec, L. et al in *Polymer* 2005, 46, p 6369-6379.

Shear thinning index SHI(2.7/210) is the ratio of the viscosity of the polyethylene composition at different shear stresses. In the present invention, the shear stresses at 2.7 kPa and 210 kPa are used for calculating the SHI(2.7/210) which may serve as a measure of the broadness of the molecular weight distribution.

Rheological parameters such as Shear Thinning Index SHI and DMS parameters are determined by using a rheometer. The definition and measurement conditions for SHI are described in detail on page 8 line 29 to page 11, line 25 of WO 00/22040.

DMS parameters indicate the frequency (ω) at which a pre-defined/reference complex modulus value is reached for a polymer in a frequency sweep experiment. The DMS parameters are suffixed with a number (e.g. DMSn) where 'n' denotes the reference G* value in the format n*10$^4$ Pa. Different DMS values as typically calculated at different reference G* are:

DMS2 indicates ω (rad/s) at G*=2*10$^4$ Pa
DMS5 indicates ω (rad/s) at G*=5*10$^4$ Pa
DMS10 indicates ω (rad/s) at G*=10*10$^4$ Pa
DMS21 indicates ω (rad/s) at G*=21*10$^4$ Pa The calculation of DMS values takes into account the entire range of ω and G* data of a frequency sweep experiment (ω=100 rad/s to ω=0.01 rad/s). The plot of log ω vs log G* is used for DMS calculation. A 3$^{rd}$ order polynomial is used to fit the data such that the R$^2$ value of the fit is more than 0.99. The values of log ω was calculated using the trend line equation at different reference G* values and consequently, values of DMS2, DMS5, DMS10 and DMS21 were evaluated. DMS 21/2 is a ratio of the DMS21 and DMS 2 values.

The molecular weight distribution is measured by using size exclusion chromatography (SEC). In the examples this was done by using a Polymer Laboratories PL-GPC220 instrument equipped with 3 columns (Polymer Laboratories 13 μm PLgel Olexis, 300×7.5 mm) at an oven temperature of 140° C. A refractive index (RI) detector, a viscosity detector (Polymer Laboratories PL BV-400 viscometer) and an IR detector (Polymer Char IR5) were used. The instrument was calibrated with linear PE standards.

The pressure resistance at all temperatures and hoop stress values is measured according to ISO 1167 with pipe dimensions 32×3 mm.

Experiment I

Preparation of a Hydrocarbon Solution Comprising the Organic Oxygen Containing Magnesium Compound and the Organic Oxygen Containing Titanium Compound 100 grams of granular $Mg(OC_2H_5)_2$ and 150 millilitres of $Ti(OC_4H_9)_4$ were brought in a 2 litre round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Experiment II

Preparation of the Catalyst

In a 0.8 liters glass reactor, equipped with baffles, reflux condenser and stirrer, 424 ml hexanes and 160 ml of the complex from Example I were dosed. The stirrer was set at 1200 RPM. In a separate flask, 100 ml of 50% ethyl aluminum dichloride (EADC) solution was added to 55 mL of hexanes. The resulting EADC solution was dosed into the reactor in 15 minutes using a peristaltic pump. Subsequently, the mixture was refluxed for 2 hours. After cooling down to ambient temperature, the obtained red/brown suspension was transferred to a glass P4 filter and the solids were separated. The solids were washed 3 times using 500 ml of hexanes. The solids were taken up in 0.5 L of hexanes and the resulting slurry was stored under nitrogen. The solid content was 64 g ml$^{-1}$ Catalyst analysis results:

Ti 10.8 wt %; Mg 11.2 wt %; Al 5.0 wt %; Cl 65 wt %; OEt 3.2 wt % and OBu 2.6 wt %.

Example I and Comparative Examples A and B

The polymerization was carried out in a continuous installation, consisting of 2 equally sized CSTR polymerization reactors in series using hexanes as diluent. The reactors contain a headspace that is continuously analyzed on the composition using an on-line analyzer. In the first reactor, a lower molecular weight polyethylene homopolymer is produced, followed by the production of a high molecular weight ethylene-butene copolymer.

Between the first reactor and the second reactor, a flash step was applied, primarily aimed at removing the hydrogen coming out from the first reactor by means of reducing the pressure.

The applied catalyst was prepared in a 400 L reactor, using a recipe analogous the one described in Experiment II. The catalyst flow to the first reactor was adjusted to reach the desired ethylene partial pressure in this first reactor as is indicated in the Table 1. The applied cocatalst was tri-isobutyl aluminium (TiBAI).

The applied recipes of Example I and Comparative Examples A and B are described in Table 1.

TABLE 1

|  | Example I | Comparative Example A | Comparative Example B |
|---|---|---|---|
| Reactor 1 |  |  |  |
| Temperature [° C.] | 88 | 88 | 88 |
| Ethylene partial pressure [bar] | 1.7 | 1.5 | 1.7 |
| $H_2/C_2$ ratio in headspace [v/v] | 4.1 | 5.4 | 3.8 |
| C2/hexane feed [kg/kg] | 0.663 | 0.649 | 0.648 |
| Viscosity number [cm$^3$/g] | 80 | 60 | 90 |
| Density [kg/m$^3$] | 971 | 973 | 970 |
| [TiBAI] mmol/L | 1.1 | 1.1 | 1.1 |
| Split % | 51 | 55 | 57 |
| Reactor 2 |  |  |  |
| Temperature [° C.] | 78 | 78 | 78 |
| Ethylene partial pressure [bar] | 2.96 | 2.1 | 2.1 |
| H2/C2 ratio in headspace [v/v] | 0.013 | 0.010 | 0.003 |
| $C_4/C_2$ in headspace [v/v] | 0.04 | 0.02 | 0.05 |
| $C_2$/hexane feed [kg/kg] | 0.29 | 0.28 | 0.27 |
| Bimodal grade (powder) |  |  |  |
| MFI5 (g/10 min) | 0.11 | 0.10 | 0.10 |
| Density (kg/m$^3$) | 951 | 956 | 953 |

Results Black Compound

The bimodal grade PE powder was stabilised by adding 2000 ppm of calcium stearate, 2000 ppm of Irganox 1010 and 1000 ppm of Irgafos 168. To this, 2-2.5 wt % carbon black (grade Printex PA from Degussa, Germany) was added. The stabilised powder mixture was extruded into pellets using a commercial NT extruder from Coperion, Germany comprising of 2 extruders in series (ZSK 250 and ZSK 350). The pellets were used for the mentioned analyses.

TABLE 2

Overview of polymer characteristics

|  | MFR$_5$ g/10 min | MFR$_{21}$ g/10 min | FRR | Density kg/m$^3$ | Mn (kg/mol) | Mw (kg/mol) | Mw/Mn |
|---|---|---|---|---|---|---|---|
| Example I | 0.11 | 3.8 | 34 | 961 | 10 | 350 | 34.0 |
| Comparative Example A | 0.10 | 5.1 | 51 | 965 | 8 | 380 | 47.5 |
| Comparative Example B | 0.10 | 4.6 | 46 | 963 | 8 | 350 | 43.7 |

TABLE 3

Overview of mechanical properties

| | Notched Charpy 23° C. (kJ/m²) | Notched Charpy-30° C. (kJ/m²) | Strain hardening modulus (MPa) | E-modulus (MPa) | Yield stress (MPa) |
|---|---|---|---|---|---|
| Example I | 32.0 ± 3.1 | 17.1 ± 0.9 | 46.2 ± 1.1 | 1106 ± 52.8 | 27.1 ± 0.4 |
| Comparative Example A | 38.3 ± 2.5 | 19.1 ± 0.8 | 38.7 ± 0.9 | 1152 ± 38.3 | 29.2 ± 0.3 |
| Comparative Example B | 23.7 ± 0.7 | 12.3 ± 0.8 | 42.9 ± 0.7 | 1192 ± 66.0 | 28.1 ± 0.1 |

TABLE 4

Overview of rheological properties

| | DMS2 | DMS5 | DMS10 | DMS21 | DMS 21/2 | SHI |
|---|---|---|---|---|---|---|
| Example I | 0.0890 | 0.4836 | 2.3779 | 20.7667 | 233 | 73.54 |
| Comparative Example A | 0.0507 | 0.2883 | 1.5157 | 16.0856 | 317 | 120.73 |
| Comparative Example B | 0.0745 | 0.4389 | 2.3682 | 24.3607 | 326 | 122.45 |

Pipe Tests

The pressure tests have been performed on pipe specimens with the dimension 32×3.0 mm. Dimensions and tolerances of the specimens comply with ISO 4427-2 provisions. A geometric mean was only calculated when minimum 2 specimens failed. Several different stress levels were selected. The results are summarized in Table 5.

The pressure resistance at all temperatures and hoop stress values is measured according to ISO 1167 with pipe dimensions 32×3 mm.

TABLE 5

Pipe tests

| Product | Unit | Example I | Comparitive Example A | Comparitive Example B | Required Minimum PE 100 reference according to DIN 8075 |
|---|---|---|---|---|---|
| Pressure tests at 20° C. Hoop stress | | | | | |
| 12.0 MPa | h | >8000 | 8000 | >8000 | 100 |
| 11.7 MPa | h | >8000 | 1700 | >8000 | 2500 |
| 11.05 MPa | h | >5000 | >5000 | >5000 | 4380 |
| Pressure tests at 80° C. Hoop Stress | | | | | |
| 4.9 MPa | h | >8800 | 1720 | 5300 | 2500 |
| 5.4 MPa | h | 4170 | 270 | 3800 | 165 |
| 5.7 MPa | h | 5900 | 1320 | 2190 | 1000 |

Example I shows significant improvement of all mechanical properties (such as impact and strain hardening modulus) for a rheologically narrower material. The pressure resistance is significantly higher than PE100. Example I shows the best performance regarding the combination of pressure resistance, impact resistance and other mechanical properties.

The invention claimed is:

1. A bimodal polyethylene having a flow ratio FRR ranging between ≥30 and ≤40, a density ranging between ≥949.0 and ≤952.0 kg/m³, an $MFR_{190/5}$ ranging between ≥0.1 and ≤0.2 g/10 min and comprising from 50 to 54% by weight of an ethylene homopolymer A and from 46 to 50% by weight of an ethylene-butene copolymer B, where all percentages are based on the total weight of the composition and wherein ethylene homopolymer A has a viscosity number ≥70 and ≤100 cm³/g and a density between ≥968 and ≤972 kg/m³ and wherein the bimodal polyethylene has
impact resistance (according to notched Charpy measurements at 23° C.; ISO 179)≥30 kJ/m² and ≤40 kJ/m²,
impact resistance (notched Charpy measurements at −30° C.; ISO 179) ≥15 kJ/m² and ≤20 kJ/m²,
strain hardening (measured according to the strain hardening method, based on the publication by Kurelec, L. et al in *Polymer* 2005, 46, p 6369-6379) ≥40 MPa and ≤50 MPa, and
shear thinning index ≥65 and ≤80.

2. The bimodal polyethylene according to claim 1 characterized in that the density of ethylene homopolymer A ranges between ≥969 and ≤971 kg/m³.

3. The bimodal polyethylene according to claim 1, characterized in that the viscosity number of ethylene homopolymer A ranges between ≥77 and ≤90 cm³/g.

4. The bimodal polyethylene according to claim 1, characterized in that the density of the bimodal polyethylene ranges between ≥949.0 and ≤951.0 kg/m³.

5. The bimodal polyethylene according to claim 1, wherein the bimodal polyethylene comprises from 50 to 52% by weight of the ethylene homopolymer A and from 48 to 50% by weight of the ethylene-butene copolymer B.

6. The bimodal polyethylene according to claim 1, wherein an amount of butene incorporated in the ethylene-butene copolymer B ranges from ≥0.1 to ≤5% by weight.

7. A process for the preparation of bimodal polyethylene according to claim 1 with a two-step slurry polymerisation process in the presence of a catalyst system comprising
(I) the solid reaction product obtained from the reaction of:
a) a hydrocarbon solution containing
1) an organic oxygen containing magnesium compound or a halogen containing magnesium compound, and
2) an organic oxygen containing titanium compound and
b) an aluminium halogenide having the formula $AlR_nX_{3-n}$ in which R is a hydrocarbon moiety containing 1-10 carbon atoms, X is halogen and 0<n<3, and (II) an aluminium compound having the formula $AlR_3$ in which R is a hydrocarbon moiety containing 1-10 carbon atoms.

8. An article comprising the bimodal polyethylene according to claim 1.

9. A pipe having a pressure resistance at 20° C., 12 MPa (measured according to ISO 1167 with pipe dimensions 32×3 mm) >8000 hours comprising the bimodal polyethylene according to claim 1.

* * * * *